3,076,008
REACTION OF PHOSPHORUS THIOIC ACIDS WITH QUINOID COMPOUNDS
George R. Norman and William M. Le Suer, Cleveland, and Thomas W. Mastin, Willoughby, Ohio, assignors to The Lubrizol Corporation, Wickliffe, Ohio, a corporation of Ohio
No Drawing. Filed Jan. 30, 1956, Ser. No. 562,019
8 Claims. (Cl. 260—461)

This invention relates as indicated to the reaction of phosphorus thioic acids with quinoid compounds.

It is a principal object of the invention to provide a process for the conversion of phosphorus thioic acids to products of substantially reduced acidity. It is a further object of this invention to provide novel compositions of matter.

Other objects of the invention will be apparent from the following detailed description thereof.

These objects have been accomplished by the process of converting an organic phosphorus thioic acid selected from the class consisting of phosphorothioic and phosphinothioic acids to products of substantially reduced acidity which comprises reacting such an acid with a quinoid compound.

The above process involves in most cases an exothermic reaction which is initiated readily at room temperature, yet which is not so exothermic as to require expensive accommodations for cooling. Generally it is sufficient merely to add one of the ingredients portionwise to the other, although in some cases, even this requirement is not necessary, and the two reactants may be mixed immediately. The reaction involves equimolar amounts of the reactant, although an excess of either reactant may be used.

The use of a solvent is beneficial and recommended particularly in those instances in which the reaction is sufficiently exothermic so as to require some attention. Suitable solvents for such instances include for example, mineral oil, petroleum ether, naphtha, dioxane, aliphatic ethers, chloroform, etc. Preferably the solvent is low-boiling so that it may be removed easily from the product mixture. When the reaction product is designed for some particular end use such as for example in crankcase lubricants, a particularly suitable solvent is the base lubricant which is contemplated for use in the ultimate application. Thus where the reaction product is intended for use in a mineral lubricant, the solvent employed in the reaction will generally be the mineral oil of the final crankcase lubricant.

Inasmuch as the reaction of the process is exothermic the temperature of the reaction generally will be within the range of 20–100° C. In some special circumstances, this temperature may be lower or higher, and for the purposes of this invention all normally satisfactory temperatures are contemplated. In some instances for example, it may be desirable to carry out the reaction at a sufficiently low temperature to inhibit the formation of byproducts which may for one reason or another be undesirable. In other circumstances, it may be desirable to carry out the reaction at a higher temperature say from 100–150° C. so as to remove continuously from the reaction medium, a solvent which is added with one of the reactants. Likewise, a higher reaction temperature may be desirable where it is desired to remove from the reaction medium gaseous or volatile byproducts which may interfere with the desired reaction or which may be undesirable in the final product mixture. Ordinarily, however, temperatures within the range of 20–100° C. are satisfactory.

The phosphorus thioic acid reactant may be either a phosphorodithioic acid indicated by the structural formula

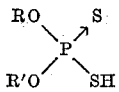

in which R and R' are non-functional organic radicals, or the phosphorus thioic acid reactant may also be a phosphinodithioic acid represented by the structural formula

in which R and R' are as defined above. R and R' in each of the above structural formulas may be the same and in most cases are the same, for the purposes of this invention such compounds in which R and R' are dissimilar are also contemplated. With regard to the phosphorodithioic acids which may be used herein, it is preferred to use such compounds having the structural formula above in which R and R' each are attached to the oxygen atoms through a carbon atom, which is attached also only to hydrogen atoms and/or other carbon atoms. Still another desirable type of phosphorus thioic acid reactant is the class of phosphoromonothioic acids such as for example O,O-di-(2-ethylhexyl) phosphoromonothioic acid.

Likewise contemplated for some aspects of the invention is the use in the process of phosphorotrithioic and phosphorotetrathioic acids as reactants with quinoid compounds.

With respect to the identity of R and R' they may include aromatic, aliphatic, and cycloaliphatic radicals. Being non-functional they are comprised for the most part of hydrocarbon radicals, i.e., alkyl, aryl, cycloalkyl, aralkyl, alkaryl, etc. The term "non-functional" however, does not exclude from these radicals the groups halo-, nitro-, ether, ester, etc. The term "non-functional" is used herein to denote radicals which are sufficiently unreactive that they do not take part in, or interfere with, the reaction of the process of this invention. Such radicals, therefore, are not reactive with quinoid compounds in the environment of the herein described process.

Specific illustrative examples of R and R' as contemplated herein include the following: Methyl, ethyl, butyl, hexyl, octyl, decyl, tetradecyl, octadecyl, eicosyl, radicals derived from mixtures of higher molecular weight hydrocarbons such as kerosene, paraffin wax, etc., omega-methoxypropyl, beta-chloroethyl, omega-carbomethoxyethyl, methoxymethyl, beta-phenoxyethyl, cyclohexyl, methylcyclohexyl, hexylcyclohexyl, cyclopentyl, phenyl, p-tolyl, p-ethylphenyl, p-chlorophenyl, o-bromophenyl, m-nitrophenyl, xenyl, anisyl, phenetyl, 2,4-dichlorophenyl, beta-phenethyl, alpha-decalyl, amylphenyl, waxphenyl, etc.

The phosphorodithioic acids, useful in the reaction of this process as indicated above, may be prepared by the well-known reaction of phosphorus pentasulfide with alcohols or phenols. Thus the reaction of phosphorus pentasulfide with 2-ethylhexanol yields O,O-di-(2-ethylhexyl) phosphorodithioic acid. Similarly the reaction of phosphorus pentasulfide with phenol yields O,O-diphenyl phosphorodithioic acid.

The phosphinodithioic acid reactant may be prepared by the process disclosed in co-pending application, Serial No. 406,323, filed January 26, 1954, now U.S. 2,797,238, involving the aluminum halide-catalyzed reaction of phosphorus pentasulfide with an aromatic compound. The product of such a reaction is the corresponding aromatic phosphinodithioic acid. Thus the use of benzene in such a reaction results in the formation of diphenyl phosphinodithioic acid. The availability of aliphatic phosphinodithioic acids depends upon the Grignard reaction of alkyl halides with phosphorus pentasulfide to yield the corresponding dialkyl phosphinodithioic acids.

The quinoid compounds which comprise the other reactant of this process include all compounds which contain the structure shown below:

This structure will be recognized as that which characterizes benzoquinone and its derivatives. Such derivatives include not only the substitution products of benzoquinone such as alkylated, chlorinated, etc. benzoquinone, but also such fused ring compounds as naphthoquinone, anthraquinone, and the like. Also included are the substitution products of these fused ring quinones, such as the alkylated naphthoquinones. The characterizing structure shown above is that of 1,4-quinone. For purposes of this invention the 1,2-quinones likewise are contemplated and in some instances they may be preferred for use in the process.

Because of its ready availability and ease of reaction in the process, benzoquinone is preferred.

The products of the herein described process are useful in lubricants, particularly for lubricants intended for use in the crankcases of internal combustion engines. When employed in small concentrations, of the order of 1 or 2%, such products are effective as inhibitors of corrosion. Thus a crankcase lubricant which contains 1% of a product available from the process of this invention is much less corrosive to the metal surfaces of the moving parts of the engine which it lubricates than it would be without the presence of such a product.

The process is illustrated in further detail by the examples which follow.

*Example 1*

To a solution of 428 grams (1.3 moles) of diphenyl phosphinodithioic acid in 500 ml. of benzene was added portionwise 140.4 grams (1.3 moles) of 1,4-benzoquinone in 750 ml. of warm benzene. The benzoquinone was added at such a rate as to maintain the temperature of the resulting reaction mixture at about 50° C. The product mixture was stirred for an additional 1.5 hours at 45–50° C. After all the benzoquinone had been added and then washed with 5% aqueous sodium bicarbonate solution, and after washing with water, the organic residue was extracted with 20% aqueous sodium hydroxide. Acidification of this extract, followed by extraction with benzene and concentration of the benzene extract yielded 425 grams of a pale-yellow, semi-solid, substantially neutral product showing the following analyses:

Percent S _____ 17.2
Percent P _____ 8.6

*Example 2*

A solution of 676 grams (2.1 moles) of di-(2-ethylhexyl) phosphinodithioic acid in 525 grams of ethyl ether was treated portionwise so as to control the temperature at about 50° C. with 226 grams (2.1 moles) of 1,4-benzoquinone. When all the benzoquinone had been added, the mixture was stirred for an additional 1.5 hours at 50° C. The product was purified and isolated as in Example 1 to yield a brown, viscous liquid weighing 260 grams. It showed the following analyses:

Percent S _____ 13.0
Percent P _____ 7.3

*Example 3*

To a solution of 93 grams (0.5 mole) of O,O-diethylphosphorodithioic acid in 200 ml. of diisopropyl ether there was added at such a rate as to maintain the temperature below 50° C., 54 grams (0.5 mole) of 1,4-benzoquinone. The resulting mixture was stirred at room temperature for an additional 8 hours and filtered. Concentration of the filtrate yielded 142 grams of a dark red, oily, substantially neutral residue having the following analyses:

Percent S _____ 21.5
Percent P _____ 10.0

*Example 4*

To a solution of 354 grams (1.0 mole) of O,O-di-(2-ethylhexyl) phosphorodithioic acid in 500 ml. of naphtha, there was added portionwise so as to maintain the temperature below 50° C. 108 grams (1.0 mole) of 1,4-benzoquinone. The product mixture was heated at 60° C. for an additional 3 hours, then filtered and the filtrate concentrated to 429 grams of a light brown, substantially neutral, oily residue showing the following analyses:

Percent S _____ 14.4
Percent P _____ 6.5

*Example 5*

To a solution of 2000 grams (2.0 moles) of a phosphorodithioic acid prepared by the reaction of phosphorus pentasulfide with a polyisobutyl-substituted (in which the polyisobutyl has an average molecular weight of about 350) phenol in 1000 grams of naphtha, there was added over a period of 12 minutes, 216 grams (2.0 moles) of 1,4-benzoquinone. The rate of addition was such as to maintain the temperature below 70° C. The resulting mixture was heated at 80–90° C. for an additional 3 hours and then filtered at room temperature. The filtrate was concentrated to 2216 grams of a viscous, reddish-brown, substantially neutral liquid having the following analyses:

Percent S _____ 5.5
Percent P _____ 2.7

*Example 6*

A solution of 374 grams (0.15 mole) of a phosphorodithioic acid prepared by the reaction of phosphorus pentasulfide with a polyisobutyl-substituted (in which the polyisobutyl groups have an average molecular weight of about 1000) phenol, in naphtha was heated to 50° C., then treated portionwise at 50–70° C. over a period of 50 minutes with 16.2 grams (0.15 mole) of 1,4-benzoquinone. The resulting mixture was heated at reflux temperature for an additional 3 hours, then washed successively with 50 grams of water, 50 grams of isopropyl alcohol, 10 grams of aqueous sodium bicarbonate, and finally with 350-gram portions of water. The residue was concentrated to 375 grams of liquid which was filtered to yield 275 grams of a substantially neutral, viscous product with the following analyses:

Percent S _____ 2.7
Percent P _____ 1.2

*Example 7*

To a solution of 423 grams (0.96 mole) of O,O-di-(2-ethylhexyl) phosphoromonothioic acid in 500 ml. of naphtha, there was added 104 grams (0.96 mole) of 1,4-benzoquinone. The exothermic reaction caused the temperature to rise to 65° C. and the resulting mixture was heated at reflux temperature for 8 hours. The mixture then was filtered and the filtrate concentrated to a reddish-brown, substantially neutral liquid having the following analyses:

Percent S _____ 6.7
Percent P _____ 7.0

Other modes of applying the principle of the invention may be employed, change being made as regards the details described, provided the features stated in any of the following claims or the equivalent of such be employed.

We, therefore, particularly point out and distinctly claim as our invention:

1. The process of converting an organic phosphorodithioic acid having the structural formula

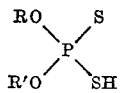

in which R and R' are alkyl radicals to a product of substantially reduced acidity which comprises reacting such an acid with a 1,4-benzoquinone.

2. The process of converting an O,O-dialkylphosphorodithioic acid to a product of substantially reduced acidity which comprises reacting such an acid with a quinoid compound selected from the class consisting of quinone, alkylated quinones and chlorinated quinones.

3. The process of converting an O,O-di-(2-ethylhexyl) phosphorodithioic acid to a product of substantially reduced acidity which comprises reacting such an acid with a quinoid compound selected from the class consisting of quinones, alkylated quinones and chlorinated quinones.

4. The process of converting a phosphorodithioic acid having the structural formula

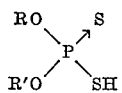

in which R and R' are selected from a class consisting of alkyl and alkylphenyl radicals to products of substantially reduced acidity which comprises reacting such an acid with a quinoid compound selected from the class consisting of quinones, alkylated quinones and chlorinated quinones.

5. The process of converting an organic phosphorus thioic acid selected from the class consisting of phosphorodithioic, phosphoromonothioic and phosphinodithioic acids in which the organic groups are selected from the class consisting of hydrocarbon and hydrocarbon groups substituted by halo-, nitro-, ether and ester groups to products of substantially reduced acidity which comprises reacting such an acid with a quinoid compound selected from the class consisting of quinones, alkylated quinones and chlorinated quinones.

6. A product prepared by the process of claim 5.

7. The addition product of a compound selected from the group consisting of dialkyl monothio and dialkyl dithio phosphoric acid to the quinoid ring of a quinone compound.

8. The process of converting an organic phosphorus thioic acid selected from the class consisting of phosphorodithioic, phosphoromonothioic, and phosphinodithioic acid in which the organic groups are selected from the class consisting of alkyl, aryl, cycloalkyl, aralkyl, and alkaryl radicals, to products of substantially reduced acidity which comprises reacting such an acid with a quinoid compound selected from the class consisting of quinones, alkylated quinones, and chlorinated quinones.

References Cited in the file of this patent

UNITED STATES PATENTS

| | | |
|---|---|---|
| 2,301,382 | Dickey et al. | Nov. 10, 1942 |
| 2,328,570 | McNally et al. | Sept. 7, 1943 |
| 2,542,604 | Weisel et al. | Feb. 20, 1951 |
| 2,609,376 | Ladd et al. | Sept. 2, 1952 |
| 2,767,206 | Whetstone et al. | Oct. 16, 1956 |

FOREIGN PATENTS

| | | |
|---|---|---|
| 937,956 | Germany | Jan. 19, 1956 |

OTHER REFERENCES

Perkow: "Naturwissenschaften," 39, No. 15, p. 353 (1952).

Allen et al.: "J. Am. Chem. Soc.," 77, pp. 2871–2875 (May 20, 1955).